United States Patent
Chun et al.

(10) Patent No.: US 9,670,352 B2
(45) Date of Patent: Jun. 6, 2017

(54) RETARDATION FILM AND A LIQUID-CRYSTAL DISPLAY DEVICE COMPRISING THE SAME

(75) Inventors: Byoung-Kue Chun, Daejeon (KR); Chang-Hun Han, Daejeon (KR); Byoung-Il Kang, Daejeon (KR); Su-Kyung Kim, Daejeon (KR); Da-Eun Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/127,014

(22) PCT Filed: Nov. 27, 2009

(86) PCT No.: PCT/KR2009/007036
§ 371 (c)(1),
(2), (4) Date: Apr. 29, 2011

(87) PCT Pub. No.: WO2010/062133
PCT Pub. Date: Jun. 3, 2010

(65) Prior Publication Data
US 2011/0211144 A1 Sep. 1, 2011

(30) Foreign Application Priority Data
Nov. 28, 2008 (KR) ........................ 10-2008-0119610

(51) Int. Cl.
| | | |
|---|---|---|
| *G02F 1/13363* | (2006.01) |
| *C08L 33/00* | (2006.01) |
| *C08L 33/10* | (2006.01) |
| *B29D 11/00* | (2006.01) |
| *C08J 5/18* | (2006.01) |
| *B29C 55/02* | (2006.01) |
| *G02F 1/1335* | (2006.01) |
| *G02B 5/30* | (2006.01) |

(52) U.S. Cl.
CPC ........ *C08L 33/00* (2013.01); *B29D 11/00644* (2013.01); *C08J 5/18* (2013.01); *C08L 33/10* (2013.01); *B29C 55/02* (2013.01); *C08J 2333/10* (2013.01); *G02B 5/3083* (2013.01); *G02F 1/13363* (2013.01); *G02F 1/133528* (2013.01); *G02F 2001/133635* (2013.01); *G02F 2201/50* (2013.01); *G02F 2413/12* (2013.01); *Y10T 428/105* (2015.01)

(58) Field of Classification Search
CPC ......... C08L 33/00; C08J 2333/10; C08J 5/18; G02B 5/3083; G02F 1/13363; G02F 2001/133635; G02F 2413/12; Y10T 428/105
USPC ............................ 428/1.33; 349/96, 117–121
See application file for complete search history.

(56) References Cited

U.S. PATENT DOCUMENTS

| | | | |
|---|---|---|---|
| 4,906,696 A * | 3/1990 | Fischer et al. ................. | 525/148 |
| 6,194,489 B1 * | 2/2001 | Nikkeshi et al. .............. | 523/212 |
| 8,097,685 B2 | 1/2012 | Tachikawa | |
| 8,119,739 B2 | 2/2012 | Asano | |
| 8,399,567 B2 * | 3/2013 | Chun et al. .................... | 525/216 |
| 2005/0018328 A1* | 1/2005 | Hata et al. ..................... | 359/883 |
| 2006/0132686 A1* | 6/2006 | Jeon et al. ..................... | 349/117 |
| 2006/0210803 A1* | 9/2006 | Ishibashi et al. ........... | 428/411.1 |
| 2007/0076152 A1* | 4/2007 | Ito et al. ....................... | 349/117 |
| 2009/0036624 A1 | 2/2009 | Okimoto et al. | |
| 2009/0078371 A1 | 3/2009 | Shimizu et al. | |
| 2009/0087650 A1 | 4/2009 | Inoue et al. | |
| 2009/0135483 A1 | 5/2009 | Asano et al. | |

FOREIGN PATENT DOCUMENTS

| | | | | |
|---|---|---|---|---|
| CN | 1763608 A | 4/2006 | | |
| JP | 05-306344 A | 11/1993 | | |
| JP | 05306344 A | * 11/1993 | ............... | C08J 5/18 |
| JP | 2004-212971 | 7/2004 | | |
| JP | 2005-292229 | 10/2005 | | |
| JP | 2006-515686 A | 6/2006 | | |
| JP | 2007-191706 | 8/2007 | | |
| JP | 2008-9378 | 1/2008 | | |
| JP | 2008-146003 A | 6/2008 | | |
| JP | 2008-242421 A | 10/2008 | | |
| KR | 10-2007-0020233 | 2/2007 | | |
| KR | 10-2008-0004720 A | 1/2008 | | |
| WO | WO 2004/098865 A2 | 11/2004 | | |
| WO | WO 2005-093476 A1 | 10/2005 | | |
| WO | WO 2006/025360 A1 | 3/2006 | | |
| WO | WO 2006/098138 A1 | 9/2006 | | |
| WO | WO 2007/108363 A1 | 9/2007 | | |

(Continued)

OTHER PUBLICATIONS

PTO Website Machine English Translation of JP 2008-146003, Kubo et al.,Jun. 26, 2008.*
Kuzuhara, Noriyasu et al. Development of New Retardation Film for VA-mode LCD-TVs, Konica Minolta Technology Report; vol. 3, 2006, p. 133-136.
"Mechanism of Generation of Photoelastic Birefringence in Methacrylate Polymers for Optical Devices"; Shafiee, et al; Journal of Polymer Science: Part B: Polymer Physics, vol. 48, 2029-2037 (2010).

(Continued)

*Primary Examiner* — Sophie Hon
(74) *Attorney, Agent, or Firm* — Dentons US LLP

(57) ABSTRACT

The present invention relates to a retardation film that comprises a blend resin of 1) an acryl-based copolymer resin that comprises an alkyl methacrylate-based monomer and a cycloalkyl methacrylate-based monomer, and 2) a resin that comprises an aromatic ring or aliphatic ring in a polymer main chain, a method for manufacturing the retardation film, and a liquid crystal display device that comprises the retardation film. The retardation film according to the present invention has excellent heat resistance, optical transparency, mechanical strength, and durability.

12 Claims, No Drawings

(56) References Cited

FOREIGN PATENT DOCUMENTS

WO     WO 2007/116818     10/2007
WO     2008/041657 A1     4/2008

OTHER PUBLICATIONS

"Mechanisms of Orientational and Photoelastic Birefringence Generation of Methacrylates for the Design of Zero-Zero-Birefringence Polymers" Shafiee, et al.; Polymer Engineering and Science—2015.

* cited by examiner

RETARDATION FILM AND A LIQUID-CRYSTAL DISPLAY DEVICE COMPRISING THE SAME

This application is a National Stage Entry of International Application No. PCT/KR2009/007036, filed on Nov. 27, 2009 and claims the benefit of Korean Patent Application No. 10-2008-0119610, filed on Nov. 28, 2008, which is incorporated herein by reference in its entirety.

TECHNICAL FIELD

The present invention provides a retardation film that has excellent heat resistance and optical transparency, low haze, is not easily broken, and has excellent mechanical strength and durability, a method for manufacturing the same, and a liquid crystal display device comprising the retardation film.

This application claims priority from Korean Patent Application No. 10-2008-0119610 filed on Nov. 28, 2008 in the KIPO, the disclosure of which is incorporated herein by reference in its entirety.

BACKGROUND ART

Recently, display technologies using various methods such as a plasma display panel (PDP), a liquid crystal display (LCD) and the like that are used instead of a known brown tube in accordance with the development of optical technologies are suggested and sold. The higher properties of the polymer material for displays are required. For example, in the case of the liquid crystal display, according to the development toward the thin film, the lightness, and enlargement of the screen area, the wide viewing angle, the high contrast, the suppression of change in image color tone according to the viewing angle and the uniformity of the screen display are particularly considered as important problems.

Therefore, various polymer films such as a polarizing film, a polarizer protective film, a retardation film, a plastic substrate, a light guide plate and the like are used, and various modes of liquid crystal displays such as twisted nematic (TN), super twisted nematic (STN), vertical alignment (VA), in-plane switching (IPS) liquid crystal cells are developed. Since these liquid crystal cells have all intrinsic liquid crystal alignment, the intrinsic optical anisotropic property is ensured, and in order to compensate the optical anisotropic property, a film in which a retardation function is provided by stretching various kinds of polymers has been suggested.

In detail, since a liquid crystal display device uses high birefringence property and alignment of liquid crystal molecules, the birefringences are different according to the viewing angle and thus the color and brightness of the picture are changed. For example, since most liquid crystal molecules that are used in a vertical alignment manner have the positive thickness retardation, in order to compensate this, a compensation film that has the negative thickness retardation is required. In addition, light does not pass through the front sides of two polarizing plates that are vertical to each other, but if the angle is inclined, the light axes of two polarizing plates are not vertical to each other, thus light leakage occurs. In order to compensate this, the compensate film that has the in-plane retardation is required. In addition, the display device using the liquid crystal requires both the thickness retardation compensation and the in-plane retardation compensation in order to widen the angle view.

It is required that the birefringence is easily controlled in order to satisfy the conditions of the retardation compensation film. However, the film birefringence is a basic birefringence which belongs to the material and is formed by the alignment of polymer chains in the film. The alignment of the polymer chains is mostly forcibly performed by force applied from the outside or is caused by the intrinsic properties of the material, and the alignment method of the molecules by the external force is to uniaxially or biaxially stretch the polymer film.

In the related art, there is a need to develop a polymer material that satisfies the above requirement properties in order to be used in displays.

DISCLOSURE

Technical Problem

It is an object of the present invention to provide a retardation film in which an in-plane retardation and a thickness retardation of the film may be controlled through a stretching method, a film that has excellent optical properties and optical transparency may be manufactured, a disadvantage of an acryl-based film that is easily broken through stretching alignment may be solved, processability is excellent, and durability such as heat resistance is excellent.

It is another object of the present invention to provide a method for manufacturing a retardation film and a liquid crystal display device that comprises the retardation film.

Technical Solution

The present invention provides a retardation film that comprises a blend resin of 1) an acryl-based copolymer resin that comprises an alkyl methacrylate-based monomer and a cycloalkyl methacrylate-based monomer, and 2) a resin that comprises an aromatic ring or aliphatic ring in a polymer main chain.

The present invention provides a method for manufacturing a retardation film, which comprises the steps of 1) preparing a blend resin composition that comprises an acryl-based copolymer resin comprising an alkyl methacrylate-based monomer and a cycloalkyl methacrylate-based monomer, and a resin that comprises an aromatic ring or aliphatic ring in a polymer main chain; and 2) molding the film by using the resin composition. The method may further comprise uniaxially or biaxially stretching the film.

In addition, the present invention provides a liquid crystal display device that comprises one or more retardation films.

Advantageous Effects

In a retardation film according to the present invention, an optical property is excellent, optical transparency is excellent, and mechanical properties, processability, heat resistance, and retardation implement property are excellent. In addition, the optical film according to the present invention is characterized in that it has a low photoelastic coefficient in comparison with a known retardation film, polarizer protective film, for example, TAC film.

BEST MODE

A retardation film according to the present invention comprises a blend resin of 1) an acryl-based copolymer resin that comprises an alkyl methacrylate-based monomer and a cycloalkyl methacrylate-based monomer, and 2) a resin that comprises an aromatic ring or aliphatic ring in a polymer main chain.

In the retardation film according to the present invention, the alkyl group of the alkyl methacrylate-based monomer of 1) has preferably 1 to 10 carbon atoms, more preferably 1 to 4 carbon atoms, and much more preferably methyl group or ethyl group. As detailed examples of the alkyl methacrylate-based monomer, there are methyl methacrylate, ethyl methacrylate and the like, it is more preferable to use methyl methacrylate, but they are not limited thereto.

In the retardation film according to the present invention, it is more preferable that the cycloalkyl methacrylate-based monomer of 1) is cyclohexyl methacrylate, but it is not limited thereto.

In the retardation film according to the present invention, the contents of the alkyl methacrylate-based monomer and cycloalkyl methacrylate-based monomer in 1) acryl-based copolymer resin may be selected from the range of 0.1 to 99.9 wt %, respectively. In particular, the alkyl methacrylate-based monomer is preferably in the range of 70 to 99.9 wt % and the cycloalkyl methacrylate-based monomer is preferably in the range of 0.1 to 30 wt %, but they are not limited thereto.

1) the acryl-based copolymer resin may further comprise the styrene-based monomer such as styrene, alpha-methyl styrene.

In the retardation film according to the present invention, it is more preferable that 1) acryl-based copolymer resin is the copolymer resin of methyl methacrylate and cyclohexyl methacrylate, but it is not limited thereto.

In retardation film according to the present invention, as 2) the resin that comprises the aromatic ring or aliphatic ring in the polymer main chain, a polycarbonate-based resin, a polyarylate-based resin, a polynaphthalene-based resin, a polynorbornene-based resin, a polysulfone-based resin, and a polyimide-based resin may be used, and it is more preferable to use the polycarbonate-based resin, but it is not limited thereto.

In the retardation film according to the present invention, it is preferable that the content of 1) acryl-based copolymer resin in the blend resin is in the range of 60 to 99 wt %, and the content of 2) the resin that comprises aromatic ring or aliphatic ring in the polymer main chain is in the range of 1 to 40 wt %, and it is more preferable that the content of 1) acryl-based copolymer resin in the blend resin is in the range of 70 to 99 wt %, and the content of the 2) resin that comprises the aromatic ring or aliphatic ring in the polymer main chain is in the range of 1 to 30 wt %.

In the retardation film according to the present invention, the glass transition temperature of the blend resin is preferably 100° C. or more and more preferably 115° C. or more. In addition, the weight average molecular weight of the blend resin is preferably in the range of 40,000 to 200,000 in views of heat resistance, sufficient processability, productivity and the like.

The thickness of the retardation film according to the present invention is preferably in the range of 20 to 200 μm and more preferably 40 to 140 μm, but is not limited thereto.

It is preferable that the retardation film according to the present invention has the in-plane retardation value that is represented by the following Equation 1 and is in the range of 30 to 80 nm and the thickness retardation value that is represented by the following Equation 2 and is in the range of 50 to −200 nm.

$$R_{in}=(n_x-n_y)\times d$$ [Equation 1]

$$R_{th}=(n_z-n_y)\times d$$ [Equation 2]

In Equations 1 and 2, $n_x$ is the refractive index in the direction in which the refractive index is highest in respects to the plane of the film, $n_y$ is the refractive index in the transverse direction in respects to $n_x$ in the plane of the film, $n_z$ is the refractive index in the direction of the thickness, d is the thickness of the film.

The manufacturing method according to the present invention comprises the steps of 1) preparing a blend resin composition that comprises an acryl-based copolymer resin comprising an alkyl methacrylate-based monomer and a cycloalkyl methacrylate-based monomer, and a resin that comprises an aromatic ring or aliphatic ring in a polymer main chain; and 2) molding the film by using the resin composition. The method for manufacturing the retardation film may further comprise uniaxially or biaxially stretching the film.

Since the detailed description of the acryl-based copolymer resin, and the resin that comprises the aromatic ring or aliphatic ring in the polymer main chain is the same as the above description, it will be omitted.

In the method for manufacturing the retardation film according to the present invention, the resin composition of the step 1) may be manufactured by melting and mixing the above components. The melt mixing of the components may be carried out by using a solution cast method, an extrusion method and the like.

In the method for manufacturing the retardation film according to the present invention, it is more preferable that the film is manufactured by using a solution cast method and a stretching process is carried out.

In addition, in some cases, it is possible to implement the extrusion method by adding a reforming agent.

The resin composition may further comprise an antioxidant, a UV stabilizing agent, heat stabilizing agent and the like, which are generally used in the art.

The manufacturing method of the retardation film according to the present invention may further comprise the step of uniaxially or biaxially stretching the film. The stretching process may be carried out by using any one of a longitudinal direction (MD) stretching and a transverse direction (TD) stretching or both of the longitudinal direction stretching and the transverse direction stretching. In the case of when both of the longitudinal direction stretching and the transverse direction stretching are carried out, any one of them may be first carried out and then the other may be carried out, or both of them may be carried out simultaneously. The stretching may be carried out through a single step or through multisteps. In the case of when the stretching is carried out in the longitudinal direction, the stretching may be carried out by using a difference in speed between rolls, and in the case of when the stretching is carried out in the transverse direction, the tenter may be used. The rail initiating angle of the tenter is 10° or less, a bowing phenomenon that occurs when the transverse direction stretching is carried out is suppressed, and the angle of the optical axis is regularly controlled. By carrying out the transverse direction stretching through multisteps, the suppression phenomenon of the bowing phenomenon may be obtained.

The stretching may be carried out at a temperature in the range of (Tg−20° C.) to (Tg+30° C.) when the glass transition temperature of the resin composition is Tg. The glass transition temperature means a range from a temperature at which storage elasticity of the resin composition starts to be reduced and the loss elasticity starts to be larger than the storage elasticity to a temperature at which alignment of the polymer chain is loosened and removed. The glass transition temperature may be measured by using a differential scanning calorimeter (DSC). It is more preferable that the temperature in the stretching process is the glass transition temperature of the film.

In the case of a small stretching machine (Universal testing machine, Zwick Z010), it is preferable that the stretching rate is in the range of 1 to 100 mm/min. In the case of a pilot stretching machine, it is preferable that the stretching rate is in the range of 0.1 to 2 mm/min. In addition, it is preferable that the film is stretched by using a stretching ratio in the range of 5 to 300%.

The optical film according to the present invention may control a retardation property by uniaxially or biaxially being stretched by using the above-mentioned method.

In addition, the present invention provides a liquid crystal display device that comprises one or more retardation films.

It is preferable that the liquid crystal display device is a VA (vertical alignment) mode liquid crystal display device.

The optical film according to the present invention is characterized in that it has a low photoelastic coefficient in comparison with a known retardation film, polarizer protective film, for example, TAC film.

In the VA mode liquid crystal display device, a retardation film may be used in compensation of a viewing angle, and has two elements for compensation. First, in the case of when a liquid crystal display is inclinedly observed, there is a light leakage compensation that is caused by the fact that absorption axes of two polarizing plates are not orthogonal each other in an appearance, and second, in the case of when a VA cell is inclinedly observed, there is a compensation that is required when the contrast is reduced when light leakage occurs due to the cell while a black color is shown by increasing the birefringence of the liquid crystal molecule.

Since a polarizer that is combined with a retardation film comprises a dichromic pigment and consists of a polyvinyl alcohol film that is uniaxially stretched, it is very weak and has the reduced durability in respects to the temperature or moisture, and laminated with the protective film. If the retardation film is capable of directly being attached to the polarizer instead of the protective film, a retardation film integral polarizing film that comprises one layer of thin protective film is capable of being obtained.

Since a cellulose derivative has excellent transparency, in the production process of the polarizing plate, there is an advantage in that the moisture that is comprised in the polarizer is capable of being volatilized through the film. However, under the high temperature and high humidity atmosphere, the dimensional change according to the absorption or the optical property change is relatively significant and in the case of when the humidity is changed at around room temperature, a change in retardation value is large, and there is a limit in improvement of the stable angle view, thus there is a problem in that the durability of the optical property of the polarizing plate is reduced.

In addition, in a polycarbonate system, since the glass transition temperature is high, the stretching process is required at high temperatures, and since the light elasticity-coefficient of the film is large, light deformation occurs by the stress. In the case of when the norbornene-based film is stretched, there are problems in that the stress is increased in the stretching or the stress nonuniformity occurs in the stretching. The solving of the above problems is capable of being solved by adopting the acryl-based retardation film that has the excellent angle view compensation effect and a small change in retardation value even though the environment is changed.

A liquid crystal display device that comprises one or more retardation films will be described in detail below.

In a liquid crystal display device that comprises a liquid crystal cell and a first polarizing plate and a second polarizing plate provided on both sides of the liquid crystal cell, the retardation film may be provided between the liquid crystal cell and the first polarizing plate and/or the second polarizing plate. That is, one or more retardation films may be provided between the first polarizing plate and the liquid crystal cell, between the second polarizing plate and the liquid crystal cell, or between the first polarizing plate and the liquid crystal cell and between the second polarizing plate and the liquid crystal cell.

The first polarizing plate and the second polarizing plate may comprise a protective film on a side or both sides thereof. As the inner protective film, there may be a triacetate cellulose (TAC) film, a polynorbornene film that is manufactured by using the ring opening metathesis polymerization (ROMP), a HROMP (ring opening metathesis polymerization followed by hydrogenation) polymer film that is obtained by hydrogenating again the ring opened cyclic olefin polymer, a polyester film, or a polynorbornene film that is manufactured by using the addition polymerization, and the like. In addition to this, a film that is made of a transparent polymer material may be used as the protective film, but it is not limited thereto.

In addition, a polarizing film is comprised in the present invention, and the present invention provides an integrated polarizing plate comprising a retardation film according to the present invention as the protective film on one side or both sides of the polarizing film.

If the retardation film according to the present invention is provided on only one side of the polarizing film, a protective film which is known in the related art may be provided on another side thereof.

As the polarizing film, a film that comprises polyvinyl alcohol (PVA) comprising iodine or dichromatic dye may be used. The polarizing film may be manufactured by dyeing iodine or dichromatic dye on the PVA film, but its manufacturing method is not particularly limited. In the specification, the polarizing film does not comprise the protective film, and the polarizing plate comprises the polarizing film and the protective film.

In the integrated polarizing plate according to the present invention, the protective film and the polarizing film may be combined with each other by using a method known in the art.

For example, the combination of the protective film and the polarizing film may be performed according to an attachment method using an attaching agent. That is, the attaching agent is applied on the surface of the PVA film that is the protective film of the polarizing film or the polarizing film by using a roll coater, a gravure coater, a bar coater, a knife coater, a capillary coater, or the like. Before the attaching agent is completely dried, the protective film and the polarizing film are combined with each other using heat pressing or pressing at normal temperature by means of a combination roll. In the case of when the hot melt attaching agent is used, the heating pressing roll should be used.

Examples of the attaching agent which is capable of being used to combine the protective film and the polarizing plate comprise, but are not limited to a one- or two-liquid type PVA attaching agent, a polyurethane attaching agent, an epoxy attaching agent, a styrene-butadiene rubber (SBR) attaching agent, or a hot melt attaching agent. In the polyurethane attaching agent is used, it is preferable to use a polyurethane attaching agent that is manufactured by using an aliphatic isocyanate compound that is not yellowed by light. In the case of when an attaching agent for one component or two component dry laminate or an attaching agent that has relatively low reactivity to isocyanate and hydroxyl group is used, a solution adhesion agent that is diluted by an acetate solvent, a ketone solvent, an ether solvent or an aromatic solvent may be used. At this time, it is preferable that the attaching agent is a low viscosity type having the viscosity of 5,000 cps or less. The above attaching agent has excellent storage stability, and it is preferable that the light transmittance of them at 400 to 800 nm is 90% or more.

If an adhesion agent has sufficient adhesion strength, it may be used as the adhesion agent. It is preferable that the adhesion agent is sufficiently cured by heat or UV and mechanical strength is improved to the level of the case of attaching agent, and surface attachment strength is large, such that it has adhesion strength so that it is not stripped as long as any one of both films to which the adhesion agent is attached is damaged.

Specific examples of the adhesive may comprise natural rubber, synthetic rubber, or elastomer, a vinyl chloride/vinyl acetate copolymer, polyvinyl alkyl ether, polyacrylate, denatured polyolefin adhesive, and a curable adhesive containing a curing agent such as isocyanate, which have excellent optical transparency.

In addition, the present invention provides a liquid crystal display comprising the integrated polarizing plate.

In the case of when the liquid crystal display according to the present invention comprises the integrated polarizing plate, one or more retardation films according to the present invention may be additionally provided between the polarizing plate and the liquid crystal cell.

MODE FOR INVENTION

Hereinafter, the present invention will be described in detail with reference to the accompanying drawings. However, the following Examples are set forth to illustrate the present invention, but the scope of the present invention is not limited thereto.

EXAMPLE

Example 1

The resin was manufactured by using 90 parts by weight of the copolymer of methyl methacrylate (80 parts by weight) and cyclohexyl methacrylate (20 parts by weight) and 10 parts by weight of polycarbonate. The glass transition temperature and the molecular weight of the manufactured resin were measured, and as a result thereof, the resin that had the glass transition temperature of 122° C. and the molecular weight of 110,000 was obtained. From this resin, the film was manufactured by using the solution casting method, and stretched at the glass transition temperature, and the retardation value of the film was measured. As a result, the in-plane retardation value/thickness retardation values were 37 nm/−75 nm.

Example 2

The resin was manufactured by using 90 parts by weight of the copolymer of methyl methacrylate (90 parts by weight) and cyclohexyl methacrylate (10 parts by weight) and 10 parts by weight of polycarbonate. The glass transition temperature and the molecular weight of the manufactured resin were measured, and as a result thereof, the resin that had the glass transition temperature of 121° C. and the molecular weight of 130,000 was obtained. From this resin, the film was manufactured by using the solution casting method, and stretched at the glass transition temperature, and the retardation value of the film was measured. As a result, the in-plane retardation value/thickness retardation values were 32 nm/−64 nm.

Comparative Example 1

The experiment was carried out by using the same method as Experimental Example 1, except that the resin was manufactured by using 90 parts by weight of the copolymer of methyl methacrylate (80 parts by weight) and phenyl methacrylate (20 parts by weight) and 10 parts by weight of polycarbonate. As a result thereof, the resin that had the glass transition temperature of 120° C. and the molecular weight of 100,000 was obtained. From this resin, the film was manufactured by using the solution casting method, and stretched at the glass transition temperature, and the retardation value of the film was measured. As a result, the in-plane retardation value/thickness retardation values were 10 nm/−20 nm.

Comparative Example 2

The experiment was carried out by using the same method as Experimental Example 1, except that the resin was manufactured by using 90 parts by weight of the copolymer of methyl methacrylate (80 parts by weight) and cyclohexyl methacrylate (20 parts by weight) and 10 parts by weight of polycarbonate. However, since compatibility between two resins was insufficient, the blend resin was not obtained.

Comparative Example 3

The experiment was carried out by using the same method as Experimental Example 1, except that the resin was manufactured by using 90 parts by weight of the copolymer of methyl methacrylate (80 parts by weight) and phenoxyethyl acrylate (20 parts by weight) and 10 parts by weight of polycarbonate. However, since compatibility between two resins was insufficient, the blend resin was not obtained.

Comparative Example 4

The experiment was carried out by using the same method as Experimental Example 1, except that the resin was manufactured by using 90 parts by weight of the copolymer of methyl methacrylate (80 parts by weight) and 3,3,5-trimethylcyclohexyl methacrylate (20 parts by weight) and 10 parts by weight of polycarbonate. However, since compatibility between two resins was insufficient, the blend resin was not obtained.

TABLE 1

| | MMA (parts by weight) | acryl-based (parts by weight) | acryl-based resin (parts by weight) | PC (parts by weight) | Miscibility | Tg (° C.) | Mw | $R_{in}$ (nm) | $R_{th}$ (nm) |
|---|---|---|---|---|---|---|---|---|---|
| Example 1 | 80 | CHMA 20 | 90 | 10 | o | 122 | 110,000 | 37 | −75 |
| Example 2 | 90 | CHMA 10 | 90 | 10 | o | 121 | 130,000 | 32 | −64 |
| Comparative Example 1 | 80 | PhMA 20 | 90 | 10 | o | 120 | 100,000 | 10 | −20 |
| Comparative Example 4 | 80 | CHA 20 | 90 | 10 | x | — | — | — | — |
| Comparative Example 5 | 80 | PhEA 20 | 90 | 10 | x | — | — | — | — |
| Comparative Example 6 | 80 | MCHM 20 | 90 | 10 | x | — | — | — | — |

MMA: methyl methacrylate
CHMA: cyclohexyl methacrylate
PhMA: phenyl methacrylate
CHA: cyclohexyl acrylate
PhEA: 2-phenoxyethyl acrylate
MCHM: 3,3,5-trimethylcyclohexyl methacrylate (1) weight average molecular weight (Mw): The manufactured resin was dissolved in tetrahydrofurane and measured by using the gel permeation chromatography (GPC).
(2) glass transition temperature (Tg): The measurement was carried out by using DSC (Differential Scanning Calorimeter) manufactured by TA Instrument, Co., Ltd.
(3) retardation value ($R_{in}/R_{th}$): After the film was stretched at the glass transition temperature, the measurement was carried out by using AxoScan manufactured by Axometrics, Co., Ltd.

From the results of Table 1, it can be seen that the retardation film according to the present invention has excellent optical property, optical transparency, mechanical properties, processability, heat resistance, and retardation implement property.

The invention claimed is:

1. A retardation film with excellent optical transparency, consisting essentially of:
   a miscible blend resin of
   1) an aliphatic acrylic copolymer resin that comprises 70 to 99.9 wt % of an alkyl methacrylate monomer and 0.1 to 30 wt % of a cyclohexyl methacrylate, and
   2) a polycarbonate resin comprising an aromatic ring in a polymer main chain,
   wherein the alkyl methacrylate monomer has an alkyl group of 1 to 10 carbon atoms,
   wherein the content of 1) the aliphatic acrylic copolymer resin in the miscible blend resin is in the range of 90 to 99 wt % and the content of 2) the polycarbonate resin in the miscible blend resin is in the range of 1 to 10 wt %,
   wherein the in-plane retardation value ($R_{in}$) of the retardation film that is represented by the following Equation 1 is in the range of 30 to 80 nm and the thickness retardation value ($R_{th}$) that is represented by the following Equation 2 is in the range of −50 to −200 nm, $$R_{in}=(n_x-n_y)\times d \qquad \text{[Equation 1]}$$

$$R_{th}=(n_z-n_y)\times d \qquad \text{[Equation 2]}$$

wherein $n_x$ is the refractive index in the direction in which the refractive index is highest with respect to the plane of the film, $n_y$ is the refractive index in the transverse direction with respect to $n_x$ in the plane of the film, $n_z$ is the refractive index in the direction of the thickness, and d is the thickness of the film, and
wherein the film has been uniaxially or biaxially stretched at a stretching ratio(s) in a range of 5 to 300% at a temperature in a range of (Tg−20° C.) to (Tg+30° C.) when the glass transition temperature of the miscible blend resin is Tg.

2. The retardation film according to claim 1, wherein the alkyl methacrylate monomer of 1) is methyl methacrylate or ethyl methacrylate.

3. The retardation film according to claim 1, wherein 1) the aliphatic acrylic copolymer resin is a copolymer resin of the methyl methacrylate and the cyclohexyl methacrylate.

4. The retardation film according to claim 1, wherein the weight average molecular weight of the blend resin is in the range of 40,000 to 200,000.

5. The retardation film according to claim 1, wherein the thickness of the retardation film is in the range of 20 to 200 μm.

6. The retardation film according to claim 1, wherein the glass transition temperature of the blend resin is 100° C. or more.

7. A liquid crystal display device comprising one or more retardation films according to claim 1.

8. The liquid crystal display device according to claim 7, wherein the liquid crystal display device is a VA (vertical alignment) mode liquid crystal display device.

9. An integrated polarizing plate comprising:
   a polarizing film; and the retardation film according to claim 1 as a protective film on one side or both sides of the polarizing film.

10. A liquid crystal display device comprising the integrated polarizing plate of claim 9.

11. The retardation film according to claim 1, wherein the in-plane retardation value ($R_{in}$) of the retardation film is in the range of 37 to 80 nm.

12. A method for manufacturing a retardation film with excellent optical transparency, the method comprising the steps of:
   1) preparing a miscible blend resin composition that consists essentially of an aliphatic acrylic copolymer resin comprising 70 to 99.9 wt % of an alkyl methacrylate monomer and 0.1 to 30 wt % of a cyclohexyl methacrylate, and a polycarbonate resin comprising an aromatic ring in a polymer main chain;

2) molding a film from the resin composition, and
3) uniaxially or biaxially stretching the film at a stretching ratio in a range of 5 to 300%, at a temperature in a range of (Tg−20° C.) to (Tg+30° C.), when the glass transition temperature of the miscible blend resin composition is Tg, thereby forming the retardation film, wherein the alkyl methacrylate monomer has an alkyl group of 1 to 10 carbon atoms, wherein the content of 1) the aliphatic acrylic copolymer resin in the miscible blend resin composition is in the range of 90 to 99 wt % and the content of 2) the polycarbonate resin in the miscible blend resin composition is in the range of 1 to 10 wt %, and wherein the in-plane retardation value ($R_{in}$) of the retardation film that is represented by the following Equation 1 is in the range of 30 to 80 nm and the thickness retardation value ($R_{th}$) that is represented by the following Equation 2 is in the range of −50 to −200 nm, $$R_{in} = (n_x - n_y) \times d \qquad \text{[Equation 1]}$$

$$R_{th} = (n_z - n_y) \times d \qquad \text{[Equation 2]}$$

wherein $n_x$ is the refractive index in the direction in which the refractive index is highest with respect to the plane of the film, $n_y$ is the refractive index in the transverse direction with respect to $n_x$ in the plane of the film, $n_z$ is the refractive index in the direction of the thickness, and d is the thickness of the film.

* * * * *